United States Patent
Rozo et al.

(10) Patent No.: US 11,843,677 B2
(45) Date of Patent: Dec. 12, 2023

(54) MULTI-BIOMETRIC IOT BRIDGE

(71) Applicant: INVERSIONES TECNOLOGICAS DE AMERICA S.A., Bogotá (CO)

(72) Inventors: David Rozo, Bogotá (CO); Gabriel Zapata, Bogotá (CO)

(73) Assignee: INVERSIONES TECNOLOGICAS DE AMERICA S.A., Bogotá (CO)

( * ) Notice: Subject to any disclaimer, the term of this patent is extended or adjusted under 35 U.S.C. 154(b) by 567 days.

(21) Appl. No.: 17/058,125

(22) PCT Filed: May 20, 2019

(86) PCT No.: PCT/IB2019/054151
§ 371 (c)(1),
(2) Date: Nov. 23, 2020

(87) PCT Pub. No.: WO2019/224697
PCT Pub. Date: Nov. 28, 2019

(65) Prior Publication Data
US 2021/0211515 A1    Jul. 8, 2021

(30) Foreign Application Priority Data
May 23, 2018   (CO) .......................... NC2018/0005389

(51) Int. Cl.
*H04L 29/06*     (2006.01)
*H04L 67/55*     (2022.01)
(Continued)

(52) U.S. Cl.
CPC .......... *H04L 67/55* (2022.05); *H04L 63/0861* (2013.01); *H04L 67/12* (2013.01);
(Continued)

(58) Field of Classification Search
None
See application file for complete search history.

(56) References Cited

U.S. PATENT DOCUMENTS 9,491,206 B2 *  11/2016  Nur ........................ G16H 40/67
9,537,654 B2 †   1/2017  Botero Montano
(Continued)

FOREIGN PATENT DOCUMENTS

CN   104836723 A   12/2015
CN   107231425 A    3/2017
(Continued)

OTHER PUBLICATIONS

International Searching Authority; International Search Report and Written Opinion, dated Sep. 11, 2019, International Application No. PCT/IB2019/054151, International Filing Date: May 20, 2019.

*Primary Examiner* — Jeffery L Williams
(74) *Attorney, Agent, or Firm* — Orbit IP, LLP (57) ABSTRACT

A method is provided for the capture of biometric or multi-biometric information using: a standard Internet of Things (IoT) data broker in an efficient and distributed IoT architecture. The MQTT information protocol is used in combination with mobile or fixed devices that manage one or more peripherals for capturing biometric information. An IoT platform is provided that allows information to be viewed in real time along with historical information and statistics regarding the use and operation of the devices to be obtained. The invention provides a method based on standard integration protocols and tools for M2M communication in IoT architectures, which acts as an information bridge, facilitating implementation to capture any type of biometric or multibiometric information, which information can be in any format (biometric templates or images in standard or proprietary formats), so that the captured information can be used in any type of biometric process.

6 Claims, 7 Drawing Sheets

(51) Int. Cl.
*H04L 9/40* (2022.01)
*H04L 67/12* (2022.01)
*H04L 67/562* (2022.01)
*G16Y 30/10* (2020.01)
*G16Y 40/50* (2020.01)

(52) U.S. Cl.
CPC ............ *H04L 67/562* (2022.05); *G16Y 30/10* (2020.01); *G16Y 40/50* (2020.01)

(56) References Cited

U.S. PATENT DOCUMENTS

| | | | | |
|---|---|---|---|---|
| 10,602,930 | B2* | 3/2020 | Lawrence | A61B 5/749 |
| 11,657,531 | B1* | 5/2023 | Ebrahimi Afrouzi | A47L 11/4091 |
| | | | | 382/284 |
| 2015/0161372 | A1 | 6/2015 | Mullin | |
| 2015/0281294 | A1* | 10/2015 | Nur | G16H 40/67 |
| | | | | 348/14.03 |
| 2016/0205106 | A1* | 7/2016 | Yacoub | H04W 12/041 |
| | | | | 726/28 |
| 2018/0199683 | A1* | 7/2018 | Gharabegian | A45B 25/16 |
| 2019/0166963 | A1* | 6/2019 | Gharabegian | G08C 17/02 |
| 2019/0298173 | A1* | 10/2019 | Lawrence | A61B 5/0024 |
| 2020/0136429 | A1* | 4/2020 | Susilo | H02J 13/00022 |
| 2020/0236325 | A1* | 7/2020 | Shibaev | H04N 7/147 |
| 2021/0211515 | A1* | 7/2021 | Rozo | H04L 67/55 |
| 2022/0141715 | A1* | 5/2022 | Mayor | H04L 41/5074 |
| | | | | 370/254 |
| 2022/0311833 | A1* | 9/2022 | Rueckert | G06F 9/45558 |
| 2023/0055091 | A1* | 2/2023 | Abramovitz | H04L 67/1046 |

FOREIGN PATENT DOCUMENTS

| | | |
|---|---|---|
| CN | 106559296 A | 5/2017 |
| CN | 106973079 A | 7/2017 |
| CN | 107861703 A | 3/2018 |
| JP | 2016045964 A | 4/2016 |

* cited by examiner
† cited by third party

1. BioVerif IoT Wifi Device
2. Fingerprint capture optical module
3. On/Off button, Touch technology
4. Processor with OS and embedded WiFi communication module
5. Rechargeable battery

MULTI-BIOMETRIC IOT BRIDGE

CROSS-REFERENCE TO RELATED APPLICATIONS

This application is the U.S. national phase of PCT Application No. PCT/IB2019/054151, filed on May 20, 2019, which claims the benefit of priority to NC2018/0005389, filed May 23, 2018, the disclosures of which are incorporated in their entirety by reference herein.

FIELD OF THE INVENTION

The present invention is related to the technical field of IoT or "Internet of Things" and its application in the field of biometrics, taking advantage of the unique characteristics of IoT information systems and protocols that have taken great importance in recent years given the continuous growth of devices, systems and actuators with internet connection capabilities, and the need to be able to connect them together, monitor them, facilitate interaction between them and obtain valuable information that can be analyzed with modern data analysis tools.

STATE OF THE ART

MQTT Protocol and IoT Data Brokers.

MQTT (MQ Telemetry Transport or Message Queuing Telemetry Transport) is a protocol based on message publishing and subscription pattern that provides one-to-many message distribution and application decoupling, which is widely used in M2M applications and IoT architecture-based solutions due to its open, simple, light and easy to implement design. That is why it has become the pioneer communications protocol for IoT and the most globally accepted in this type of implementation, allowing work in environments with bandwidth limitations and optimizing the communication protocol to the maximum without losing the characteristics of reliability, scalability and availability of information in real time, besides being defined as a free implementation standard (ISO/IEC PRF 20922).

The MQTT protocol is based on the paradigm of publication and subscription of totally asynchronous messages, which are sent (by the publisher) or listened to (by the subscriber) through rules called "Topics" that function as specific messaging routes to listen or publish an associated message and are assimilated to a hierarchy of directories that ensure access to specific information, for example the topic "Casa_1/Dispositivo_1/Reporte/Temperatura" could have the associated message of the temperature value registered by device "1" of house "1", which can be found in any structure or information format.

Figure 1:
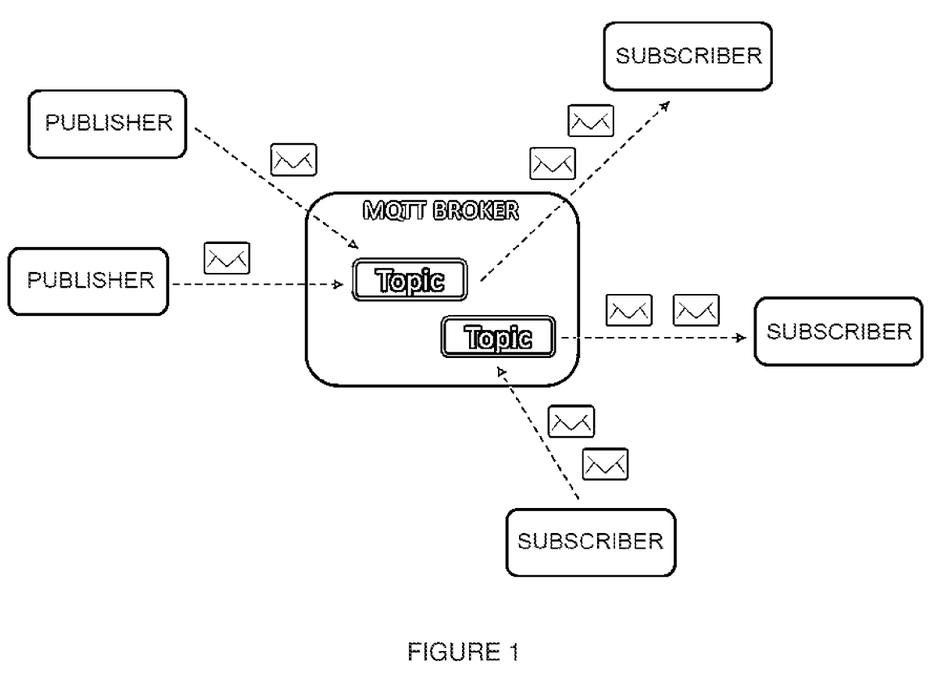
FIG. 1. General operation diagram of the MQTT protocol using the asynchronous message publication and subscription pattern for M2M communication in IoT architectures FIG. 2. General architecture of the IoT platform FIG. 3. General flow diagram of the disclosed procedure for capturing biometric information FIG. 4. General architecture of integration of a multi-biometric device with a IoT data broker for MQTT messaging, the IoT platform and integration applications.

This communication model is an alternative to the traditional client/server model, since in MQTT a client simply sends a particular message (publisher) associated with a topic asynchronously to one or multiple clients (subscribers) which may or may not listen to the message depending on the subscription rules (Topics) of the messages to which they subscribe (FIG. 1).

This means that clients and subscribers are completely autonomous and independent, since the publisher or subscriber does not need to know the existence of other publishers or subscribers in the network and the message can reach one or multiple subscribers where only those "interested" in receiving said information will receive it through asynchronous events, creating an ideal environment for communication between any type of devices since it allows creating infinity of filters or information topics without restrictions in the messages that are exchanged, which are distributed in an asynchronous, easy and robust way.

The previous specification requires the existence of a component called "Broker" which acts as an asynchronous publisher and subscriber simultaneously and performs the distribution of messages, that is, it acts as a kind of communications "switch" that distributes the messages published to one or multiple subscribers according to the subscription topics and in an architecture based on asynchronous events. These IoT information brokers are completely agnostic to the format or content of the messages that are sent between devices, since it is not their function to control the devices, process the information contained in the messages or synchronize the information between the parties as in traditional client/server architectures, which is ideal for M2M communication and IoT architectures allowing devices to autonomously modify the content of the messages, which can be in any format and contain any type of information, without the need of a specific intermediate system or that a central system should be reprogramed or reconfigured to support new functionalities or incorporate any type of device implementing different functionalities.

Companies like Facebook have implemented the MQTT communication protocol in their messaging applications, thanks to the high transactional level, speed, freedom in the information that is transmitted and implicit capabilities of automatic filtering of information based on topics for the distribution of asynchronous messages, similarly, MQTT-based IoT brokers have become the heart of IoT services offered by providers such as IBM, Google, Amazon and Microsoft, among others, due to the freedom and simplicity for integration and interaction between any type of device, as well as ease of application integration and the flexibility to manage a large amount of information in an agile and light way.

On the other hand, there are multiple advantages in IoT brokers that give unique characteristics to MQTT-based solutions for scalable and robust data management.

Scalability

Given the publication and subscription scheme, operations in IoT data brokers based on MQTT are executed asynchronously and simultaneously with a very high level of transactionality and managed by events, operating in a fully distributed architecture based only on filter and redirection of messages from publishers to one or multiple subscribers, the IoT broker does not fulfill the functions of controlling the devices, processing or synchronizing information, which allows extreme simplicity in its operation where the devices or applications are autonomously responsible and independent of "understanding" each other. IoT brokers can implement self-managed and self-synchronized communication nodes (based simply on topics) to support millions of simultaneous connections without losing efficiency in the distribution of information.

Self-Managed Client Connection States

The MQTT protocol allows setting a device disconnection indicator to a topic that can be distributed automatically and through events to clients subscribed to the topic, allowing to automatically know the connection status of the device without having to ask an intermediate server using a special protocol or command or know its network access point.

Message Filtering

The MQTT protocol and the publication and subscription mode make it possible to filter information from publishers and to subscribers very easily and efficiently, allowing the creation of an infinity of combinations of message filters based on a standard protocol on a distributed architecture, without restriction on the content or format of the messages associated with the topics that are exchanged between devices. It is the responsibility of client applications and devices to implement the appropriate filters (topics) to receive messages asynchronously and manage interactions since the devices are completely independent and self-managed in the publication and subscription of their messages, that is, each of them decides what it wants to receive or publish filtering by messaging routes the information they are interested in.

Access Rules

Given the specification of the MQTT protocol, clients are totally independent and self-managed, they do not depend on a specific central system that controls or manages them and they decide, through their internal logic and topic filters, the information they want to receive or publish. IoT brokers allow the specification of access rules as a security layer that allows limiting a publisher from publishing to a topic for which they are not authorized, or that a subscriber listens to a message which they are not authorized to listen to, even if they want to publish or subscribe to said topic.

Security

In addition to the specification of access rules, IoT brokers implement important security features that can work independently or simultaneously:

Authentication of connections by username and password
Authentication through digital certificates
Encryption of the communication channel using digital certificates (SSL/TLS)

The exponential growth of devices with the capacity to connect to the internet at a global level has driven the development of new technologies that facilitate information management and interconnection between any type of device, allowing them to "talk" with each other, and with information systems that wish to interact with them regardless of the type of information communicated between them or the existing functionalities in each device, therefore favoring the plurality of different types of devices in the same information system according to the requirements of the IoT architecture.

Today's existing tools in the field of IoT allow structuring information systems based on architectures that are far from traditional client/server schemes, which present great limitations when managing information due to their synchronized management requirements between devices, management of device network access points and external information systems that integrate with them, dependence on proprietary information protocols and complex and difficult to scale connection synchronization models, as well as creating a server dependency central for any change they wish to make in the interaction with each other or incorporation of new devices with different functionalities, requiring a reprogramming of the three parts (devices or client/device and server) or deployment of multiple versions that allow the correct operation of the system, generating an impact on the integral system.

One of the great solutions that the IoT or "Internet of things" presents to break with traditional architectures, has been the development of IoT communication brokers based on asynchronous communication protocols for the publication and subscription of messages, specifically designed for M2M communication and IoT architectures, such as MQTT, which are currently available as "messaging" services or IoT communications bridge in cloud service providers (IBM Bluemix, Microsoft Azure, Amazon Web Services, Google Cloud, etc.) and in commercial embodiments or even freely deployable open source.

The MQTT protocol is an ideal solution for communication between devices due to the asynchronous message publication and subscription model, the infinity of information filters through messaging routes (topics), the distributed publication of messages to multiple simultaneous clients (one-to-many), and security schemes based on simple rules for message filtering, industry standard encrypted communication, and connection authentication. Additionally, the MQTT protocol has been designed to facilitate the specification to be implemented in messages between devices regardless of the content or format of the message associated with the topics (according to the requirements of the IoT architecture), generating an extremely high efficiency in the transport of information in an asynchronous communications model and working in unstable communication networks or with limited bandwidth, without limiting the transmission of data packages with enough size (up to 256 MB) to create complex interactions between devices.

Biometric identification is based on obtaining characteristic and unique physical features of a person that, when encoded and compared against reference information stored in a database of biometric information associated with a single person, through mathematical and statistical processing of comparison, make it possible to verify his identity. In the same way, there are methods of visual comparison by experts who are in charge of determining if the biometric information captured from a person in an image format is equivalent to that reference image available in databases or personal identification documents, which applies mainly to fingerprint biometrics and the services of professionals in the field of Dactyloscopy.

Biometric fingerprint identification continues to be the pioneering biometric identification method in the world, thanks to the wide acceptance and ease of integration with different information systems, as well as the low costs of a technology that has advanced rapidly and allows smaller and more robust biometric sensors to become available.

In this field, there are still deficiencies in mobile biometric information capture systems, where there are currently solutions that range from devices that act in disconnected mode to capture information that can be used later, through devices connected to cellular networks, linked by wireless technologies such as Bluetooth or WiFi through embedded applications, or even incorporated into cellular devices for a purely personal use of the wearer of the device.

However, most of these devices incorporate capture sensors that are limited in the quality of the biometric information they generate and have major deficiencies in the management of information security, which has made biometric technology for robust enrollment or authentication based on biometric information standards not the most popular in mobile solutions and that the integration of this technology further entails complex developments to implement and dependence on proprietary systems.

In the state of the art there is the patent "US2012/0105200 A1", wherein a device for capturing biometric data is exposed, which has the capacity to transmit wireless data (WiFi, Bluetooth or Infrared) to a cellular mobile device in which an application is installed that is responsible for processing the information received by the biometric device and sending it to a service belonging to a central system for biometric matching purposes. However, this patent shows the need for an application installed on a cellular mobile device, which must be in charge of encrypting the wireless communication between the device and cellular mobile (securing the channel), preparing the biometric information and sending it to a central service, where this security-level model presents a vulnerability, given that there is a distributed application installed on a cell phone and a mobile operating system, which is vulnerable to information analysis and computer hacking.

In the same way, a traditional client/server model is exposed, where a central system synchronously receives the information through the application installed on the cellular mobile to carry out a biometric matching process and generates the dependence of the device on a system of proprietary information both at the client level and at the central level, where the distribution of information in real time, speed and independence of the devices and applications that integrate them with the central server is limited, generating complex schemes for horizontal scaling and modifications or incorporation of functionalities, data synchronization and connections.

On the other hand, the device is free to be used by a mobile device, without specifying protection modes for the device at the hardware level, connection restrictions with mobile devices and networks or possibilities for limiting connectivity to the central system, in a similar way, the persistent storage of biometric information on the device or temporarily in the intermediary software of the mobile device to which it is connected, generates a security problem since nothing ensures that the information cannot be intercepted, analyzed or even modified to impersonate the identity of a person, or stolen and stored.

Also in the state of the art there is a patent with file number "12109326" extended via PCT as "U.S. Pat. No. 9,537,654B2" with variations and new claims in the extended patent, and called "Parallel network of biometric authentication", which in its original application exposes a proprietary central software and its own device designed to operate with said software, where through the central software, device management, communication, search and biometric authentication of fingerprint templates are carried out, exposing an integral service that requires the identification number of a person to be authenticated and a code that identifies the device (specified in the patent description as the serial number of the device), to enable the capture of biometric fingerprint templates tied to a process that validates the identity of a person against a database.

The system is based on the specification of a software at a central level with a proprietary protocol, and that one of its functionalities is the management, control and activation of fingerprint capture devices specifically designed to operate with the proprietary central software, managing all the network and that requires devices directly connected to this central software for device control and biometric authentication of fingerprint templates, the devices are activated for the biometric capture of templates by the central system by means of individual referencing by the code that identifies the fingerprint capture device and which is specified in its description as the device serial number.

This system, however, is based on software developed with a specific purpose and functionalities, making use of the implementation of a proprietary protocol which is understood only by the central on which the entire network and its devices depend, evidencing a traditional client/server scheme where the central system is in charge of managing the devices themselves, their connection, communication and specific protocol that implements their functionalities, synchronizing the required functionality with the other party (client), which limits the distribution of information in real time, speed and independence of the devices and applications that integrate them, and generates complex schemes for horizontal scaling, modifications or incorporation of functionalities to the system, and data and connection synchronization, causing a total dependence of the devices with a specific and proprietary central system, where any change in the communication protocol or functionality between any of the parties would require reprogramming not only of the devices and clients, but also reprogramming and/or deployment of multiple versions of the core software, affecting the entire network to enable new implemented changes.

The proposed system, states that the activation of the devices for biometric capture of the template is carried out from the central through the serial number of the device, which shows a security vulnerability since the serial can be supplanted since it is a visible identifier and of easy physical access on the device. Additionally, the system exposes a procedure where the device operates by sending only biometric fingerprint templates, which limits the applicability of the solution for processes where there are biometric systems that work based on standard fingerprint image formats. (RAW, BMP, WSQ), image-based authentication systems (AFIS, proprietary integrations, etc.), or even authentication through visual inspection by fingerprint specialists. The system exposes as such an integral process wherein the core software carries out communication device management, search and biometric authentication of the fingerprint templates and delivery of specific information of the result of the biometric authentication process with that person's fingerprint templates.

SUMMARY OF THE INVENTION

The present invention is related to the technical field of IoT (Internet of Things) or "Internet of Things" and its application in the field of biometrics, taking advantage of the unique characteristics of IoT information systems and protocols that have taken a great importance in recent years given the continuous growth of devices, systems and actuators with internet connection capabilities, and the need to be able to connect them together, monitor them, facilitate interaction between them and obtain valuable information that allows them to be analyzed with modern data analytics tools.

The invention specifically discloses a procedure that describes a specification for capturing biometric or multi-biometric information (one or multiple biometric factors. E.g.: fingerprint, iris, veins, face, etc.), making use of a standard IoT data brokers in an efficient and distributed IoT architecture implementing the MQTT information protocol and applicable to mobile or fixed devices that manage one or multiple biometric information capture peripherals; a mobile electronic device for capturing biometric information that implements the described procedure and a IoT platform that allows viewing information in real time and obtaining historical information and statistics on the use and operation of the devices.

The invention, therefore, making use of the disclosed procedure, provides a method based on standard integration tools and protocols for M2M communication in IoT architectures, which acts as an information bridge, facilitating the implementation to capture any type of biometric or multi-biometric information, which can be found in any format (images or biometric templates in standard or proprietary formats) in order for the captured information to be used in any type of biometric process that requires it.

Objectives and Advantages of the Invention

The procedure disclosed in the present invention, solves the need for a specification that makes use of a standard communication protocol of easy access and implementation such as MQTT for the capture of any type of biometric or multi-biometric information through the interaction between any device (Embedded Hardware, software application, service, etc.) that manages biometric capture peripherals connected by any means (USB, Serial, Wireless, etc.) and integrating client (Embedded Hardware, Library, integration API, web service, REST, software application, etc.) where they can be connected using any means of connection to a data network that enables communication with a standard and easily accessible IoT MQTT messaging broker that allows M2M communication in a IoT architecture to capture any type of biometric information, decoupling the applications and devices in their operation model and a proprietary central system, simplifying the developments and integrations and facilitating the plurality of devices, eliminating the restrictions in traditional client/server systems and proprietary developments.

The invention therefore makes it possible to capture multi-biometric information (one or multiple biometric factors) in one or multiple devices individually or simultaneously thanks to the characteristics of the MQTT protocol and the MQTT messaging IoT brokers, simply by focusing on how they understand each other. parties who want to "speak" autonomously without relying on a proprietary central system in the processes of device control, information processing, change management, synchronization between parties, understanding of proprietary protocols and other functions performed by a traditional client/server system.

Additionally, the disclosed procedure makes it possible not to require intermediate applications or systems for processing or storing information, at any point in the process, nor in the device that implements it, nor in an intermediate central system, since the IoT broker does not have this responsibility and the integrating client (who receives the captured information) "understands" with the device in an asynchronous M2M communication model without requiring the intervention of any additional system to process, synchronize or interpret the information. The disclosed procedure also solves the need to capture one or multiple biometric factors from one or multiple devices in the same biometric information capture transaction, facilitating the integration and implementation of processes that require it.

Another advantage od the invention is to rely on a means to grant additional security to the communication between applications and devices, where standard methods are used that do not require complex and proprietary developments and implementations, since they already use the standard features of the IoT tools being used, where it is possible to establish encrypted communications channels and define different means for authentication (User/Password, and/or digital certificates), as well as additional features of information filters implemented autonomously and self-managed in the device/application without the intervention of intermediate systems and security rules for publication of and subscription to messages, additionally there already is an implicit specification of quality of service levels that ensure the integrity of the messages. On the other hand, the mobile biometric device disclosed in this invention implements all these security features, acting as an autonomous and independent device, with the advantage of being able to manage its access credentials, block its messaging channel through dynamic MQTT topics without using visible or easily accessible static information on the device, in addition to implementing alternate methods of protection against computer hacking attempts, unauthorized connections or unauthorized access to hardware.

The disclosed procedure by making use of a standard and easily accessible MQTT messaging IoT broker, further allows great ease of integration of multi-biometric information capture in any type of process that requires it and by any information type or format that is required (biometric templates and/or images), since the broker favors the implementation of IoT architectures and does not process or limit the content or format of the information, therefore by making use of the disclosed procedure it is of free specification the biometric information that wants to be exchanged between the parties as well as the specific parameters for configuration of the capture peripherals, commands, security information and anything else that is desired to exchange without the need to affect or modify a central system and therefore affect the entire integral system. Making use of the disclosed procedure and the proposed tools, any modification that is desired to be made in the communication between the parties or by adding new devices or functionalities, requires only intervention in the parties that want to communicate (in their internal logic) where the broker's operation logic is standard and its information distribution model is agnostic to the way in which the devices and applications are understood in its communication model, as well as clients and devices are decoupled from each other and not dependent on a specific system.

The invention facilitates the information management of a large number of deployed devices, since the use of the MQTT protocol and the MQTT messaging IoT brokers, allows specifying the information filters for simultaneous distribution (one to many) of information to multiple clients and applications, facilitating the management of device operation parameters, connection states, alerts and other information that may be relevant in real time. This is evidenced in the present invention, by integrating the revealed biometric device with a IoT platform, where it acts as a "IoT Gateway" that reports information relevant to its operation through asynchronous MQTT messages that are easily integrated into any type of solution and that allow comprehensive management of the operation and status of the devices, as well as the analysis of historical information and statistical trends with specialized tools. Furthermore, in the face of an exponential growth in devices, the IoT tools used in the invention allow an distributed easy-to-implement scaling based solely on self-synchronized nodes by messaging routes (Topics) and a totally asynchronous model based on the publishing and subscription of messages paradigm, facilitating the management of operation and autonomy of the devices, as well as the deployment of solutions.

DETAILED DESCRIPTION OF THE INVENTION

The invention discloses a procedure that describes a specification for capturing biometric or multi-biometric information (one or multiple biometric factors. E.g.: fingerprint, iris, veins, face, etc.), making use of a standard IoT data broker in an efficient and distributed IoT architecture implementing the MQTT information protocol and applicable to mobile or fixed devices that manage one or multiple biometric information capture peripherals; a mobile electronic device for capturing biometric information that implements the described procedure and a IoT platform that allows viewing information in real time and obtaining historical information and statistics on the use and operation of the devices.

In more detail, the procedure described makes use of a IoT broker that allows the distribution of asynchronous messages based on the MQTT protocol in a publication and subscription model totally agnostic to the content or format of the messages that is implemented between the parties, allowing the creation of autonomous mobile or fixed devices for capturing biometric information with any type of connectivity to data networks and integration applications based on asynchronous processing by events that allow M2M (Machine to Machine) interaction between client and device in a IoT architecture, eliminating the restrictions of traditional client/server models and taking advantage of the characteristics of message distribution, decoupling and independence between the parties, reliability, scalability and security provided by IoT brokers and the MQTT protocol.

In a higher level of detail, the invention discloses a biometric mobile fingerprint capture device called "BioVerif IoT WiFi" with WiFi wireless connection technology that implements the procedure disclosed in the invention based on the MQTT standard, acting as an autonomous and fully self-managed device for capturing biometric information asynchronously based on events. The invention also discloses a IoT platform that allows to dynamically view in real time, information published through MQTT messages by the devices, store and analyze the information with Big Data tools.

The invention, therefore, making use of the disclosed procedure, provides a method based on standard integration tools and protocols for M2M communication in IoT architectures, which acts as an information bridge, facilitating the implementation to capture any type of biometric information. or multi-biometric, which can be found in any format (images or biometric templates in standard or proprietary formats) in order for the information captured to be used in any type of biometric process that requires it.

Procedure for Capturing Biometric Information Using the MQTT Protocol and an MQTT Messaging IoT Broker The procedure revealed in this invention implements the MQTT communication protocol, which is a widely used standard for IoT systems, allowing the creation of an M2M ("Machine To Machine") communication model in IoT architectures between an integrator client that requires the capture of information of one or multiple biometric factors of any type and devices that manage one or multiple biometric information capture peripherals. This communication scheme uses a standard MQTT messaging IoT broker, which serves as a dispatcher of asynchronous messages through publish and subscribe events using messaging routes based on MQTT topics, implementing a distributed IoT architecture which grants total independence and decoupling of applications and devices between them and with the central system, as well as high scalability of the solution, taking into consideration that the MQTT messaging brokers are agnostic to the format or content of the information they distribute and their operation is based in asynchronous message publishing and subscription to topics, takes away responsibility for common tasks in traditional client/server systems, such as control of connected devices, information synchronization, data processing, management of proprietary protocols, etc.

The procedure is based on devices that are registered and linked to unique customers who are defined as the owners of the devices and who have a unique customer identifier that is assigned in an information system, which serves as the first filter of the MQTT topic that initially achieves a self-managed device regarding the information that it wishes to receive from a specific client, since this client identifier is part of the device's messaging routes and will not receive any data from a client that does not correspond to it, since it autonomously decides not to receive them through this initial filter applied to the topic.

The second filter parameter of the topic will be an "access token" to the messaging route that in the system is a code (represented in text) of manageable access that is related to the client of the first filter and the device or several devices, in addition to not being a visible parameter that is easily accessible on the devices, providing additional security in the information filter and it is also a dynamic token that can be modified if the security of the devices is compromised in such a way that it prevents the messaging path from functioning as it does not correspond to the complete information filter (topic). Thus, the device will not receive any messaging event that does not fully correspond to its messaging routes which are dynamic and manageable.

The topic can also be filtered by parameters such as the type of device, version and other parameters that may be relevant, additionally other filters are specified for the topic, which correspond to the commands or events published, for example: "CapturaHuella", "Capturaris", "CapturaFoto", "CapturaFotoFoto" etc. Along with the additional specification of filters in the topics that you want to add to the device's messaging route (E.g.: . . . /ID_Tipo_Device/Version/ID_Cliente/Token_Acceso/MAC/Command/ . . . ).

This, thanks to the MQTT specification, allows a device not to process invalid or unnecessary information and not receive information that does not correspond to it or does not want to receive, since it decides it autonomously through its logic of filtered topics or messaging routes, ensuring that you only receive the message through an asynchronous event that is explicitly published with all the filters applied by a client and that is also complemented by the access rules that are defined in the IoT broker as additional security to avoid unauthorized publications or subscriptions.

Figure 3:
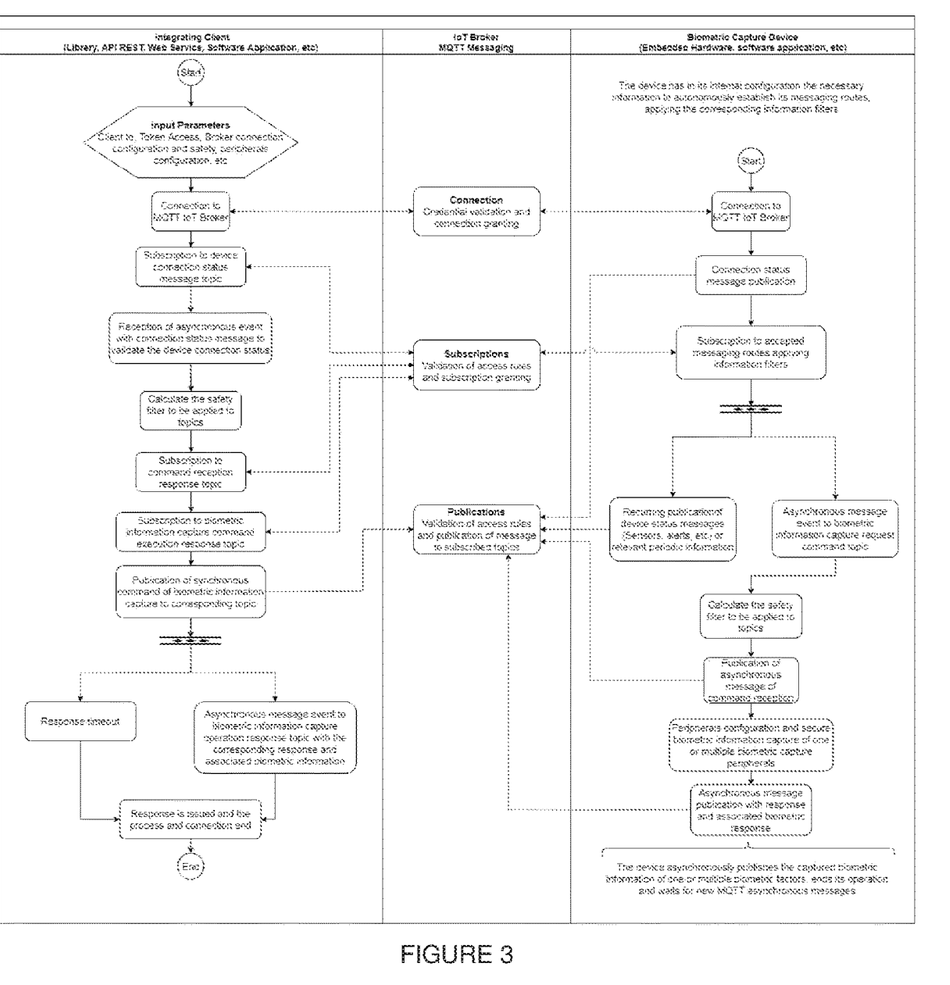

FIG. 3 shows the exposed procedure of M2M communication in a IoT architecture through asynchronous events of MQTT messages, making use of secure, dynamic and manageable messaging routes based on MQTT topics with a free specification of the format of the messages associated with the topics (JSON, XML, Binary, etc.), where the following procedures are followed, for which a "Device" may be any integrated hardware or software application that implements the procedure to enable the capture of one or multiple biometric factors through the management of one or multiple capture peripherals, as well as an "Integrator Client"

could be any software component or Information system that directly implements or exposes a method of integration of the procedure (E.g.: Applicative, web service, Integration component, etc).

1—Procedure executed on the device:
  a. The device begins its operation and establishes a connection to a MQTT messaging IoT data broker by means of an encrypted communications channel using, in a preferred embodiment, the SSL/TLS standard and access credentials for authentication, which may correspond to username/password and/or X509 digital certificates that identify it. With the connection established, the device publishes its connection status specifying that it is online.
  b. Next, the device makes the subscription with the IoT messaging broker to the topics or messaging routes that it wishes to listen to, taking into account that the device is self-managed and therefore does not depend on any intermediate system that tells it how to act or What information to listen to, it decides the information that he is interested in receiving, everything resides in its internal logic and he will not receive events from MQTT messages to which he has not subscribed (E.g. . . . /ID_Tipo_DepositivoNersion/ID_Cliente/Token_Acceso/CapturarHuella), which are also filtered as specified above and can correspond to any biometric capture command that the device is programmed to execute, which can manage one or multiple biometric devices (E.g.: fingerprint capture module, iris reader, vein reader, photographic camera, etc.) and therefore capture one or multiple simultaneous biometric factors. The command can correspond to any operation, for example: "Captura huella", "Captura Iris", "Captura huella y foto", etc., where the "Payload" or data associated with the event of the MQTT response message of a device can be found in any format and contains the information of the operation executed by the device including the encrypted biometric information that is captured.
  c. Each publication to a messaging route is associated with the message or "Payload" that is specified and that corresponds to the configuration parameters required by each operation and its associated peripherals, said message can also be found in any format (binary, JSON, XML, etc) since the broker is agnostic to the information exchanged in the M2M communication of the devices and applications. Therefore, this exposed method proposes that in the command received by the device to execute an operation, the integrator client sends the specific configuration that may be necessary for the biometric capture peripherals that the device manages (E.g.: Minimum capture quality, resolution, etc.) and can be exchanged if the security information is required (E.g.: encryption key if a symmetrical encryption is implemented) to be applied to the captured information, taking into account that the initial connection to the IoT broker has been established by means of standard SSL/TLS security which encrypts the channel for transporting the sensitive information.

Additionally, this procedure proposes the exchange of a dynamic synchronization key contained in the request command to capture biometric information, which allows a mathematical calculation to be carried out using any method known to both the publisher of the message (who sends the message for execution of the command), as well as by the device that will publish the captured biometric information, so that the result of this mathematical calculation is added by the parties to the topics as a publication "security filter" (by the device or devices that receive the command) and subscription (by the one who published the command or customers interested in hearing the information), in such a way that messages are always exchanged to a random messaging route with an additional assurance that only the parties involved that know said calculation will receive the message (E.g.: . . . /ID_Tipo_Dispositivo/Versión/ID_Cliente/Token_Acceso/Filtro_Seguridad/CapturaFoto), taking into account that the parties are totally autonomous, do not know each other, process messages based on asynchronous events and that the IoT broker will distribute the MQTT message asynchronously to one or many clients that are subscribed to the specific messaging route.

Taking into account the foregoing, when the device asynchronously receives a message to execute a command, it is proposed in this procedure that the device perform the known mathematical calculation, specified above. The result of this calculation is applied as "Security filter" additional to the topic to which the device must publish to notify the receipt of a command to whoever is subscribed to receive said message and knows the messaging route with the calculated security filter. Therefore, the device publishes the message to the corresponding command confirmation messaging route, which is a specific, filtered and secure route, announcing to who can listen to the message of that messaging route that the message has been received and the biometric information capture operation will be executed.

d. The device (or devices) then captures the biometric information of one or multiple peripherals that it is in charge of managing, applying the configuration received in the request message that the peripherals require to capture information and must then publish the captured biometric information. to the MQTT messaging path (or paths) that correspond to the command (or commands) response and that in addition to the filters such as client identifier, access token, command and others that are defined, it is filtered by the security filter calculated and added to the publication topic, ensuring that the information will be received by the interested and authorized parties that are subscribed to the response messaging routes. The response with captured multi-biometric information (multiple biometric factors captured from different peripherals), can be published in a single message or in individual asynchronous messages of free specification that are interpreted by the client that requested the capture. Once the response message (or messages) is published, the device ends its processing, since this being completely autonomous and independent, it only publishes its message without further validation than the knowledge of the messaging route to which to publish, since being a model based on a IoT architecture that deviates from the traditional client/server architecture, the device is not managed by any central system, so it only takes care of carrying out its task and publishing the message, plus the other party must also be self-managed and have been in charge of subscribing to the corresponding secure messaging route to receive a response and know how to process the message associated with the asynchronous event that it can receive from a device in an M2M communication.

2—Procedure executed in the "Integrator Client" from where the request to capture information of one or multiple biometric parameters is made:
  a. The parameters required to execute the operation must be known, so the parameters required for the information capture process must at least be:
    unique identifier of the client to which the device (or devices) is associated in an information system.
    Access token to the messaging route of the device or devices.
    Information and connection security parameters to the IoT data broker.
    Biometric information capture peripherals configuration parameters.
    Command(s) to execute to capture information of one or multiple biometric factors (Ex: Fingerprint, Iris, Face, Veins, etc.)
  b. The MQTT connection to the IoT broker is established with the corresponding access keys (User/Password, X509 certificate, etc.) and through a session with an encrypted channel using in a preferred embodiment an SSL/TLS standard.
  c. Subscription is made to the MQTT topic that allows knowing if there are active and online devices for requesting biometric information, by receiving the corresponding asynchronous event with the MQTT message of the connection status.
  d. Subscription is made to the topic of confirmation of receipt of the command by the device, which will allow receiving confirmation events when a capture command is sent and ensures that there is at least one device that belongs to the client, its messaging route is enabled using the access token, it listens to the messaging route with all the specific filters, it will execute the action and that the device has correctly calculated the "security filter" to add to the topic and make it unique and dynamic, providing additional security. Therefore, being subscribed to the command confirmation topic, the client must mathematically calculate the security filter with the synchronization key that is exchanged in the capture request message and using the desired calculation method, which must also be known by the device or devices, allowing the parties to apply the correct filter to the subscription and publication topics, this taking into consideration that it is using an autonomous communication model, wherein the devices or client/device that want to interact between themselves must decide the information they are interested in receiving and knowing how to "talk" between them according to the IoT architecture model, without depending on a central system managing the control process of the devices, processing and synchronizing the information.
  e. Subscription is carried out to the command execution MQTT topic by the device (where it is expected to receive asynchronous messages of response to the operation once a request command is sent), which is filtered by the parameters already specified, including the security filter already calculated in the answer topic. The executed command can correspond to any biometric or multi-biometric capture operation, for example: "Capturar Huella", "Capturar Irs", "Capturar huella y foto", etc., associated with a messaging route (Ex: . . . /ID_Tipo_Dispositivo/Versión/ID_Cliente/Token_Acceso/Filtro_Seguridad/CapturaIris), where the "Payload" or message associated to the event of the MQTT response message from a device can be found in any format and contain information of the operation executed by the device including biometric information being captured.
  f. Publishing of the message is made to the topic of the specific command that it wants to execute (Eg: . . . /ID_Tipo_DispositivoNersión/ID_Cliente/Token_Acceso/CapturaHuella), filtering the MQTT topic by means of all the parameters already specified that enable the messaging route and that one or more devices can access if they have subscribed to it in an autonomous way. In the published message, the specific configuration of the biometric capture peripherals that the device (or devices) manages is sent, as well as security information if required (e.g.: encryption key if symmetric encryption is implemented) to apply to the information captured, taking into account that the initial connection to the IoT broker has been established using the SSL/TLS security standard that encrypts the channel for transporting sensitive information. Additionally, the synchronization key is sent that enables carrying out a mathematical calculation known by the parties to apply to the topic filter of the command confirmation and response to the operation messaging route, in such a way that there is always a response with the biometric information to random messaging routes with an additional security that only the involved parties that know said calculation will receive the message, taking into account that the parties are totally autonomous, process the messages based on asynchronous events and that the IoT broker will distribute the message to one or many clients that are subscribed to a specific messaging route as long as the subscribers have permission for it.
  g. With the client already subscribed to the messaging route (topic) of confirmation of receipt of a command (step d), the reception of the asynchronous MQTT message of confirmation of receipt of the message by a device (or devices) is expected letting it know that there are devices that received the command. This operation, by being completely asynchronous and independently executed by the device, must propose the option of a maximum waiting time to receive confirmation of receipt of the command by the devices.
  h. With the client already subscribed to the response message path (topic) (step e), it is expected to receive at least one MQTT asynchronous message with the biometric information captured by the device that would contain the data (E.g.: fingerprint template, fingerprint image, Iris image, photograph, etc.). This operation, being completely asynchronous and independently executed by the device, must propose the option of a maximum waiting time to receive the response data of the information capture and if multiple biometric factors are captured, these can even be published as a response by the device or devices asynchronously and individually until the process is complete, taking into account that there is no traditional client/server architecture that synchronizes the parts, but an asynchronous and self-managed M2M communication model by each part of the IoT architecture, such that by the device executing the action it simply publishes messages asynchronously without knowing how the receivers will interpreted them that must know how to manipulate and process the information in their communication model with the devices.

The MQTT specification requires that the topic or messaging route to which information is published, be explicitly specified, otherwise, the device may not receive any event with a message that is published by another party, since the devices decide in their internal logic explicitly which events they want to receive and the IoT messaging broker is completely agnostic to the format or content of the messages sent between devices, so it is not its function to control the devices, process the information contained in the messages or synchronize the information between the parties as in traditional client/server architectures. This allows applications and devices to be decoupled and to implement the capture of any type of biometric information and any functionality, taking care only of the parties that want to communicate, without affecting a central system and, therefore, the whole integral system.

This procedure opens up infinite possibilities to create solutions that implement the capture of one or multiple biometric characteristics, through the client/device or device/device M2M communication with standard tools of the IoT industry, designed to allow the plurality of any type of device in the same information system and eliminate dependence on proprietary central systems, the limitations in synchronized information management, the complexity in modifying or implementing new functionalities and the difficulty in scaling the solutions, among other security limitations and information distribution of the traditional client/server systems.

Additionally, this procedure being based on asynchronous messaging routes, would allow that if multiple clients share the messaging routes, a response to capture biometric information can be received instantly by more than one biometric process that requires it (E.g.: Inspection visualization and processing in an automated system) in a single publication of information captured by a device, since the job of the IoT broker is to distribute an asynchronous message to one or many clients that, after validating the access security rules, have subscribed to specific messaging routes.

The present invention discloses a mobile fingerprint capture device developed using this procedure, plus the possibilities of applications using the same specification remain open to the integration of additional biometric capture peripherals in devices that behave as "IoT gateways" that incorporate the required functionalities and allow in an efficient and scalable way, through the use of standard and easily accessible tools and protocols in the IoT industry, to integrate the capture of biometric or multi-biometric information of any type and its eventual integration with biometric systems that require it.

BioVerif IoT WIFI Mobile Biometric Device (1)

The present invention discloses a mobile biometric fingerprint capture device (1) fully developed by us, named "BioVerif IoT WiFi", which has been designed to operate under a IoT scheme, implementing the MQTT communication protocol as the basis for its autonomous and self-managed operation (subscription and publication of messages) and that implements the operation procedure disclosed above which can be evidenced in the flow diagram of FIG. 3 by connecting to an MQTT messaging IoT broker.

The device incorporates a biometric fingerprint capture module with optical technology that ensures the highest quality in capturing biometric information and that additionally has the following characteristics:
Optical Technology Reader
Live fingerprint and false fingerprint detection
Generation of fingerprint images in biometric standards
Fingerprint template generation in biometric standards
Encryption of biometric templates and fingerprint images
In addition, the device has the following functionalities:
Touch technology power button
Built-in WiFi communication module
Built-in WiFi Host mode
Rechargeable battery
Connection using SSL/TLS channel security standard and implementing mixed authentication methods such as digital certificates and/or username/password
Hardware intrusion detection (Tamper Detection) that disables the device against unauthorized physical opening (FIPS 140-2 level 3 compliance)
Filtering of WiFi access point authorized for connection through the physical MAC address of the access point.
Status report of sensors, alerts and internal parameters through standard MQTT messages. This allows integrating the functionality of visualizing in real time information on battery status, charge level, tamper sensor status, low battery level alert, etc.
Automatic report of connection status through standard MQTT messages.

The device, by implementing the disclosed procedure, acts as a "IoT Gateway" with the particularity of managing a module for capturing biometric fingerprint information, it is completely autonomous and self-managed, since by subscribing to MQTT topics that act as routes for specific messaging, allows filtering the information it wants to receive or publish, ensuring that the message corresponds to it according to its messaging route and even the client to which it belongs, since both the client's identifier and all the filters applied to the messaging route are found in its internal configuration and are processed internally, therefore without requiring control or validation from a centralized system. All this allows the device to be decoupled from the central system in terms of its operation, information protocol or interaction with other costumers or devices, without further requiring an additional software intermediary application managing the device or the information it generates since everything resides in its internal logic and only requires connectivity to the data network, achieving a scheme one hundred percent oriented towards and IoT architecture without being affected by a specific central system, according to the theory of IoT system that allow a plurality of devices and models to communicate in the same platform, where the IoT broker does not have how to control de devices, process the information contained in the messages or synchronize the information between the parties as in traditional client/server architectures.

Figure 4:
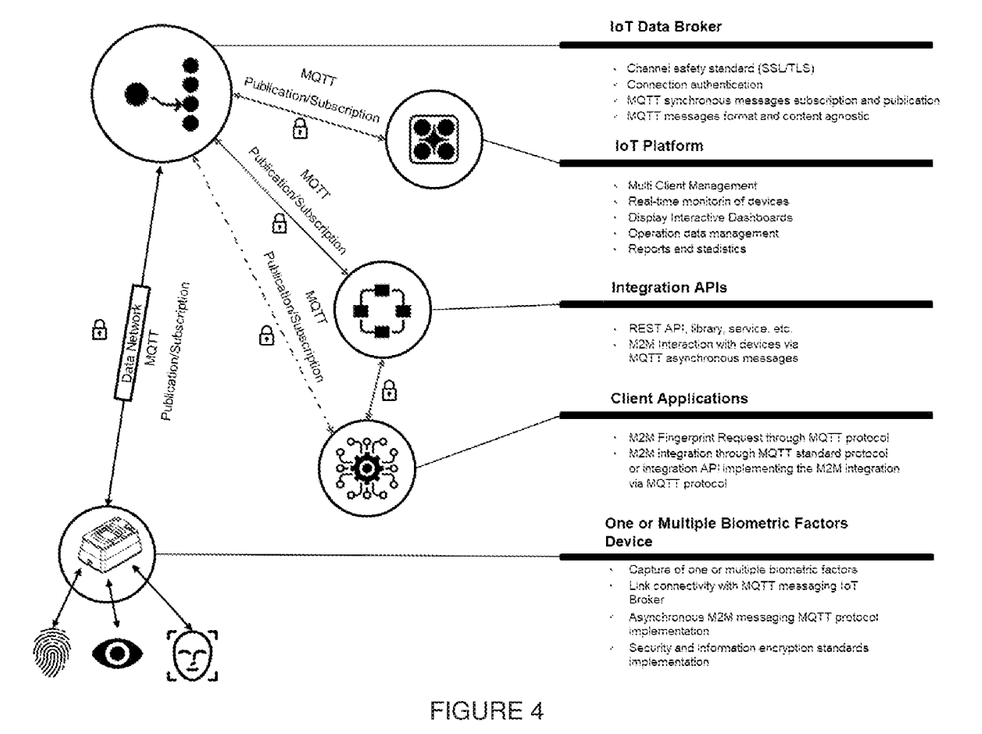
Figure 5:
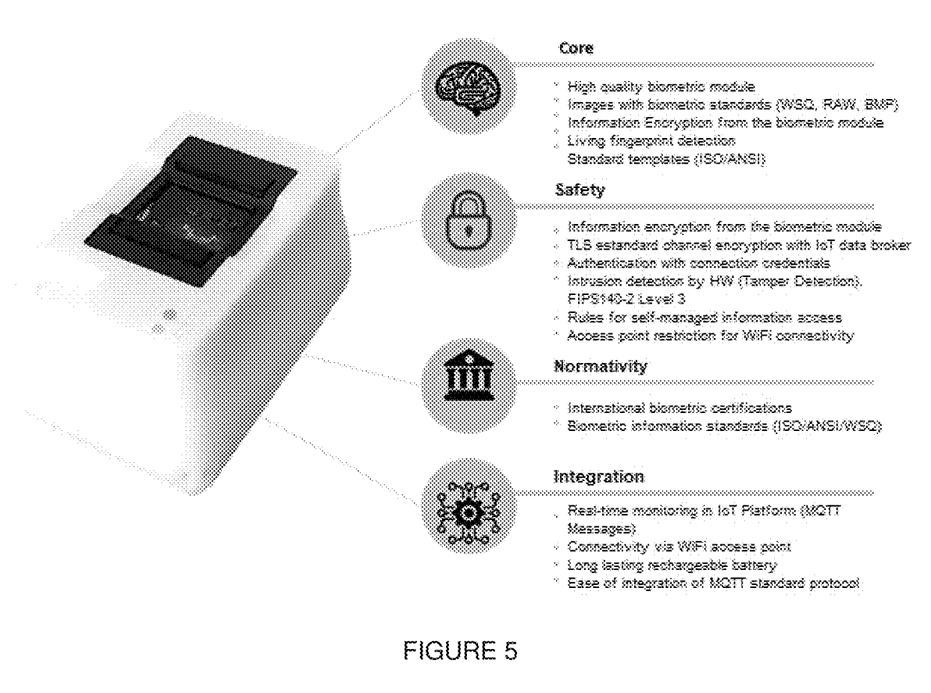
Figure 6:
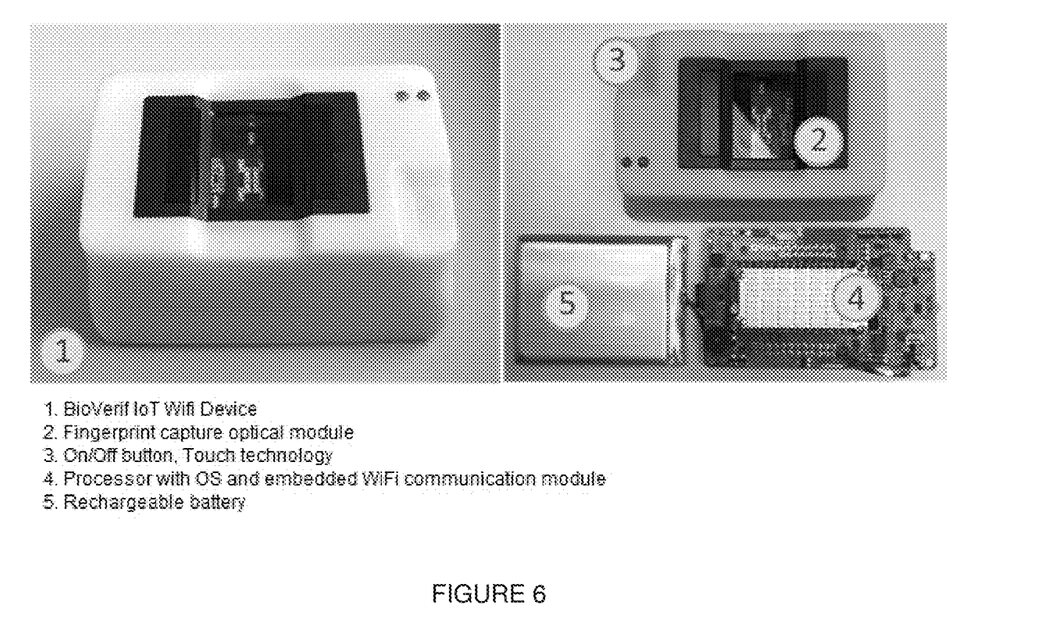
Figure 7:
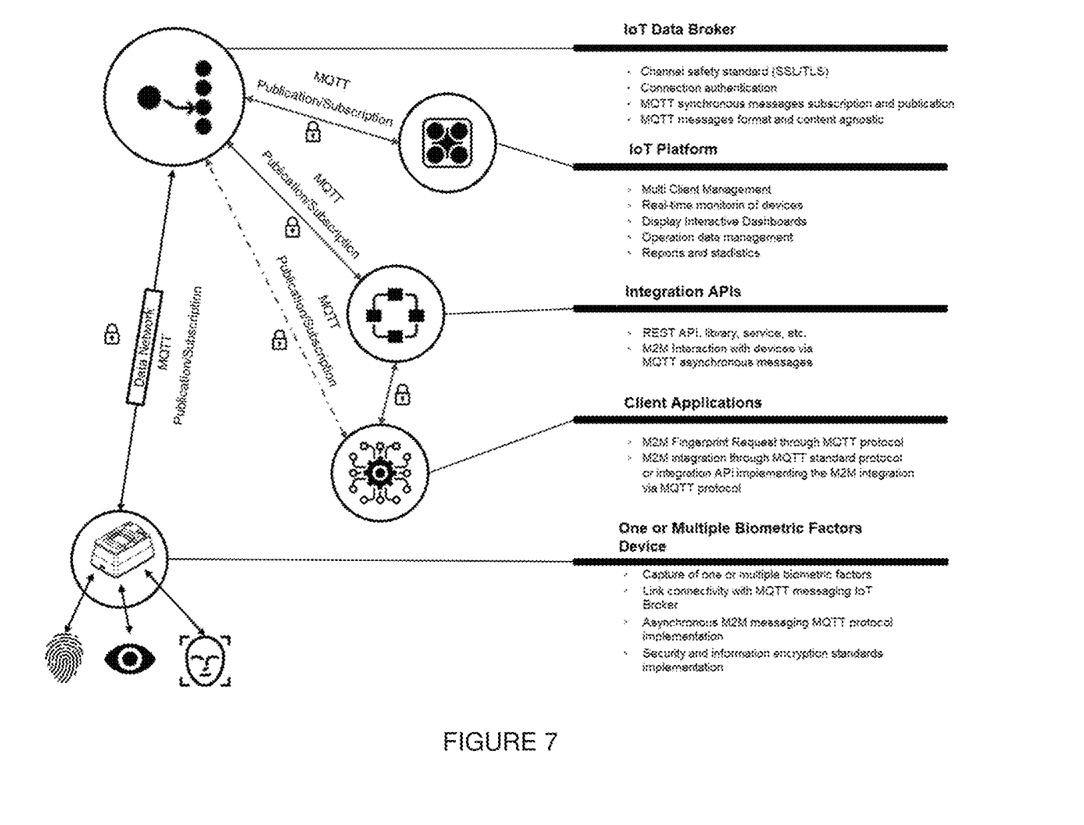

The device behaves as a "IoT Gateway", so the invention allows the integration of the MQTT messages published by the device with the IoT platform revealed in this invention (FIG. 4), this allows to have a comprehensive system, by which, through an interactive platform, it is possible to manage in real time the operating status of the devices, record information from sensors and meters, generate information statistics, define access rules and other functionalities that the IoT platform has.

IoT Platform

Figure 2:
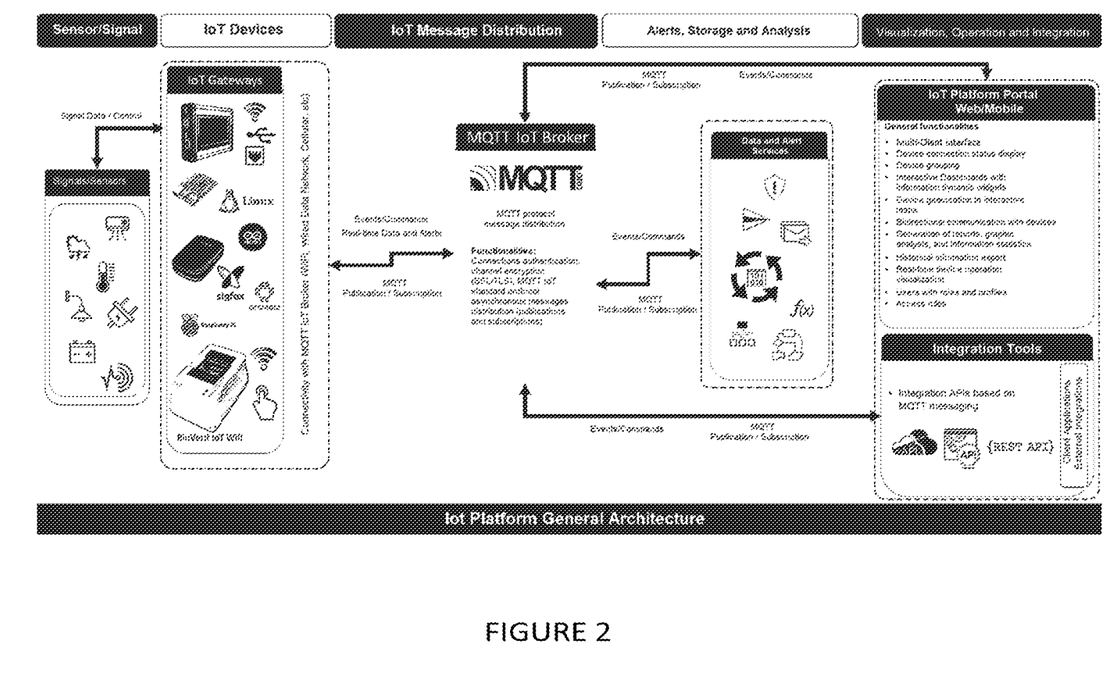

The present invention made possible the integration of the disclosed mobile biometric device with a comprehensive IoT platform, fully developed by us, which connects to a standard IoT messaging broker MQTT and it allows the connection of any type of device or "IoT Gateway" that allows the collection of signals from sensors and management of actuators in the field, which behave as completely autonomous and self-managed devices, since they publish and subscribe to topics that act as messaging routes to exchange information dynamically and in real time with other devices, integration applications and with the management web portal of the IoT platform through the IoT MQTT messaging protocol, as can be seen in FIG. 2. To this platform, thanks to being designed under a IoT architecture with standard tools, multiple devices have been integrated for multiple use cases (energy management, cold chain management, machine monitoring, etc.) and, in the case of the mobile biometric device disclosed in this invention, by acting as a "IoT Gateway" that connects to the IoT broker, it reports the connection status, status of its sensors and internal counters through standard MQTT messages allowing be monitored on the IoT platform like any other device that implements MQTT messaging and obtain relevant information in real time on its operation, connection status and internal sensors, as well as store, visualize and export historical and statistical information through big data tools.

The IoT platform creates an environment that allows it to be multi-client, multi-device, with independent management characteristics of the real-time information of the devices and providing a graphical environment to the user for viewing information in real time, consulting historical data and data processing to generate statistics and trends on millions of stored data using tools employed in IoT systems for the analysis of unstructured data and big data.

The functionalities and characteristics of the platform disclosed in this invention include and are not limited to:
- View and audit the connection and operation status of each device, broken down by customer, grouping devices and interactively in real time
- Visualize and audit the information of the sensors and actuators reported by the devices interactively and in real time. These signals can be associated with different types of sensors, such as battery levels, electrical measurements, temperatures, activation relays and any relevant data either obtained from external sensors or from internal sensors of the "IoT Gateway".
- View interactive dashboards with relevant information about the devices (Sensor measurements, device messages, connection status, etc.). Dashboards listen to information in real time through the MQTT protocol and have graphic information components that can be dynamically incorporated by the user, which not only show instant information on sensor measurements or connection states, but also allow the incorporation, in a dynamic and interactive way, of information with visual graphic statistics (trends, comparisons, mathematical calculations, etc.) and exportable in different formats.
- Interact remotely and bi-directionally with devices.
- View operation logs, generate statistical reports and consult historical activity information and measurement data of sensors and actuators reported by the devices.
- Manage credentials and access rules of system devices and users.
- Manage the creation, edition and elimination of clients, devices, groups, users, alerts, notifications and other implicit functionalities of the platform.
- Register information on signals, alerts, messages and other information received in real time by the devices on the platform.
- Dispatch alerts and notifications (emails, chats, webhooks, etc.) received in real time by the devices.
- Visualize and monitor the operation and alerts of the devices through georeferencing in interactive maps and in real time

REFERENCES 1. https://aws.amazon.comes/pub-sub-messaaing/ Amazon Web Services. April 2018
2. https://aws.amazon.com/es/pub-sub-messaging/benefits/ Amazon Web Services. April 2018
3. http://docs.oasis-open.org/mqttUmqttv3.1.1/mgtt-v3.1.1.html OASIS. April 2018
4. https://www.oasis-open.org/committees/mqtt/charter.php OASIS. April 2018
5. http://mgtt.ora/MQTT. April 2018
6. https://www.lbm.com/deveioperworks/nbrary/IQt-mqtt-whv-qood-for--IoT/IQt-mgtt-why-good-for-iot-odf.pdf (pdf). IBM. April 2018
7. https-//aws.amazon.com/es/bioqs/aws/aws-iot-doud-services-for-connected-devices/. Amazon Web Services. April 2018

Glossary of Terms and Definitions Used in this Document

Biometrics

Techniques that seek to analyze and measure the physical or behavioral traits of an individual in order to detect and compare characteristic points to unequivocally verify their identity. Some examples are fingerprints, retina, ins, facial patterns, veins, hand geometry, voice, or even behavior such as signature, step or click.

Biometric Template

It is constituted by the significant data extracted from a biometric factor captured from a sensor. From this small data set, storage and verification is facilitated.

Message Publication and Subscription Model

The publishing and subscription based messaging model is a form of asynchronous service-to-service communication used in modern IoT architectures and those based on microservices. This model allows the construction of completely independent and distributed processing blocks that are based on asynchronous events of publication and subscription of one-to-many messages, allowing simultaneous processing in distributed services, optimizing performance, reliability and scalability. In this communication model, publishers and subscribers are decoupled, without knowledge of the other's existence, and they work completely independently of each other, allowing independent scaling without restrictions on the other party or in an intermediate system. Subscribers express their interest in certain topics and publishers publish messages to topics, then the message is delivered to all the subscribers to the topics.

Topic

A messaging broker in a publishing and subscription model uses topics that function as specific messaging routes of the messages published to the subscribers of the topics. Topics are defined as a hierarchy that filters the information of interest, allowing a subscriber to only listen to the information that interests him without depending on the other party or an intermediate system and avoids erroneous distribution or unnecessary information processing. The symbol "/" is used as a separator of the filters in the topic hierarchy and it is possible to use wildcards (Wildcards) to define broader information filters. Some examples of topics which would have associated messages: "Casa/Temperatura/Cuarto1/Reporte", "Dispositivo1/Sensores/Humedad/Reporte", "Dispositivo/Comandos/Activación Actuadores/Actuador1".

MQTT

MQTT (MQ Telemetry Transport or Message Queuing Telemetry Transport) is a standard protocol (ISO/IEC PRF 20922) based on the pattern of publishing and subscripting asynchronous messages that provides one-to-many message distribution and application decoupling, which is widely used in M2M applications and solutions based on IoT architectures due to its open, simple, lightweight, and easy-to-deploy design. It is renowned for its low bandwidth requirements and low resource consumption, which makes it ideal for working on wireless and bandwidth-constrained networks, as well as implement the publication and subscription model, it provides one-to-many message distribution based on messaging topics without limiting the format or content of the associated messages, making it an ideal protocol for the IoT (Internet of Things) favoring heterogeneity of any type of "device" in a distributed information system.

IoT (Internet of Things or Internet of Things)

Internet of things (in English, Internet of things, abbreviated IoT) is a concept that refers to the digital interconnection of everyday objects with the internet, as well as any machine or device that collects information from sensors and actuators. The internet of things refers to the interaction of these objects or machines with each other and with other information systems, therefore, IoT solutions are generally based on architectures oriented to asynchronous messages publication and subscription events that facilitate the distribution of information in real time, scalability and the incorporation of any type of device or functionality in a dynamic way.

API (Application Programming Interface)

An API or "Application Programming Interface" is a set of routines, functions, and procedures exposed in one software component to be used by another software component as an abstraction layer. They can be exposed as web services (SOAP, RPC, REST), libraries, classes or functions of operating systems.

The invention claimed is:

1. A process for capturing biometric information, comprising the steps of:
   implementing an MQTT communication protocol on a device that manages one or multiple biometric information capture peripherals, enabling an M2M (Machine To Machine) communication model in a IoT (Internet of Things) architecture between the device and an integrating client, such as API, software application, web service, integrated device, to capture one or multiple biometric factors;
   applying an MQTT messaging broker (intermediate) for the publication and subscription of asynchronous messages;
   establishing a connection from the integrating client with the MQTT messaging broker (intermediate) using several access and security methods, implemented individually or jointly, such as and not limited to communication channel encryption, user/password and/or digital certificates;
   subscribing the integrating client requiring the biometric information capture to a random, calculated MQTT messaging route and implementing filters to receive the response of the capture process;
   publishing by the integrating client a message to a MQTT messaging route to request the capturing process implementing the corresponding filters; including a dynamic identifier of the messaging route as part of the filters and configuration information for the capturing process in the message;
   receiving the capture request message publication of one or multiple biometric factors in the capture devices, in a MQTT messaging route implementing filters, comprised by those implemented in the capture request by the integrating client;
   applying the configuration received to the peripherals and performing the capture of one or multiple biometric factors by the capture devices;
   calculating, by the capture devices, the random messaging route and publishing MOTT messages with the information captured from one or multiple biometric factors;
   receiving by the integrating client who requested the biometric information capture, the response messages published by the devices in the calculated random MQTT messaging route, for responding to the biometric information capture to which it was initially subscribed, wherein the information received corresponds to one or multiple biometric factors captured by one or multiple devices responding to the operation; and
   once the information capture is performed, performing the disconnection of the MQTT messaging broker by the integrating client.

2. The process of claim 1, wherein the capturing device corresponds to an integrated hardware, an application, a service or software component managing one or more biometric information capturing peripheric, among others.

3. The process of claim 1, wherein the integrating client corresponds to an integrated hardware, an application, a service, API or software library implementing the capture process.

4. The process of claim 1, wherein said process allows, in only one transaction, the simultaneous capture of biometric or multi-biometric information from one or multiple biometric information capturing devices which implement the process.

5. The process of claim 1, wherein it allows the capture of biometric or multi-biometric information (one or multiple biometric factors), which corresponds to images and/or templates of the captured biometric factors which can be found in any standard or proprietary format.

6. The process of claim 1, wherein it allows the implementation of any structure, type and format of the messages associated with the messaging routes to which the integrating devices and clients subscribe or publish is accepted, which are interpreted by the parties autonomously and independently without the intervention of an intermediate system that interprets, synchronizes or processes the information.

* * * * *